(12) United States Patent
Konja

(10) Patent No.: US 6,220,628 B1
(45) Date of Patent: Apr. 24, 2001

(54) VEHICLE OCCUPANT PROTECTION APPARATUS AND METHOD HAVING MULTIPLE STAGE CONTROL

(75) Inventor: Raad Konja, Farmington Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/452,629

(22) Filed: Dec. 1, 1999

(51) Int. Cl.[7] .................................................. B60R 21/32
(52) U.S. Cl. .............................................................. 280/735
(58) Field of Search ............................................. 280/735

(56) References Cited

U.S. PATENT DOCUMENTS

| | | | |
|---|---|---|---|
| 3,966,224 | 6/1976 | Campbell et al. | 280/735 |
| 5,134,306 | 7/1992 | Schumacher et al. | 307/10.1 |
| 5,411,289 | 5/1995 | Smith et al. | 280/735 |
| 5,484,166 | 1/1996 | Mazur et al. | 280/735 |
| 5,498,028 | 3/1996 | Carlin et al. | 280/735 |
| 5,608,269 | 3/1997 | Fendt et al. | 307/9.1 |
| 5,702,124 | 12/1997 | Foo et al. | 280/735 |
| 5,722,686 | 3/1998 | Blackburn et al. | 280/735 |
| 5,746,444 * | 5/1998 | Foo et al. | 280/735 |
| 5,809,439 * | 9/1999 | Damisch | 280/735 |
| 5,964,815 * | 10/1999 | Wallace et al. | 280/735 |

* cited by examiner

Primary Examiner—Kenneth R. Rice
(74) Attorney, Agent, or Firm—Tarolli, Sundheim, Covell, Tummino & Szabo L.L.P.

(57) ABSTRACT

A vehicle occupant protection apparatus (10) includes an occupant protection device (20), such as an air bag module, that is actuatable for protecting a vehicle occupant (14). The protection device (20) has first and second stages (44 and 46). A first driver (38) actuates the first stage (44) of the protection device (20) and a second driver (42) actuates the second stage (46) of the protection device. An enable arrangement (64) is responsive to actuation of the first stage (44) of the protection device (20) to enable the actuation of the second stage (46) of the protection device (20).

20 Claims, 5 Drawing Sheets

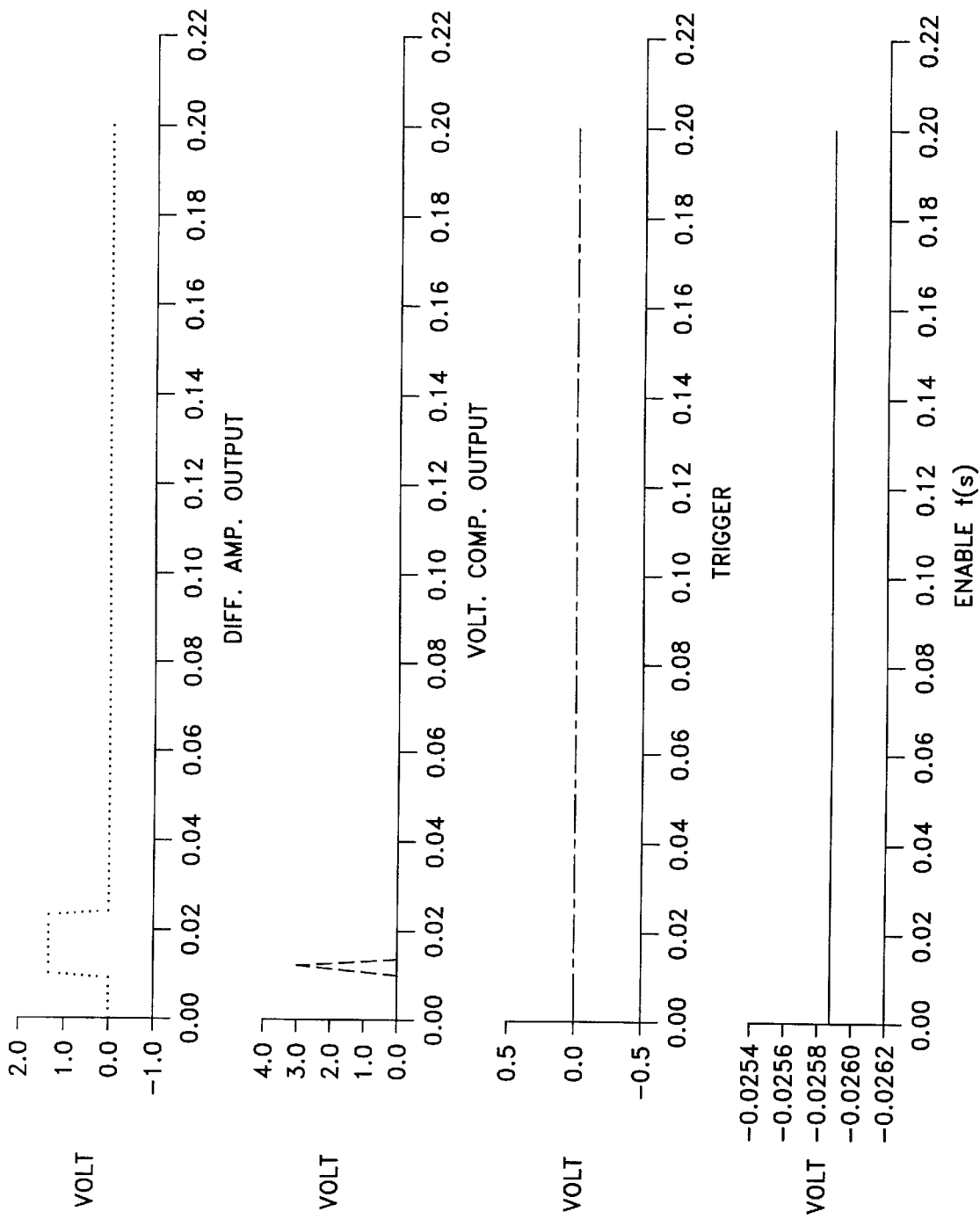

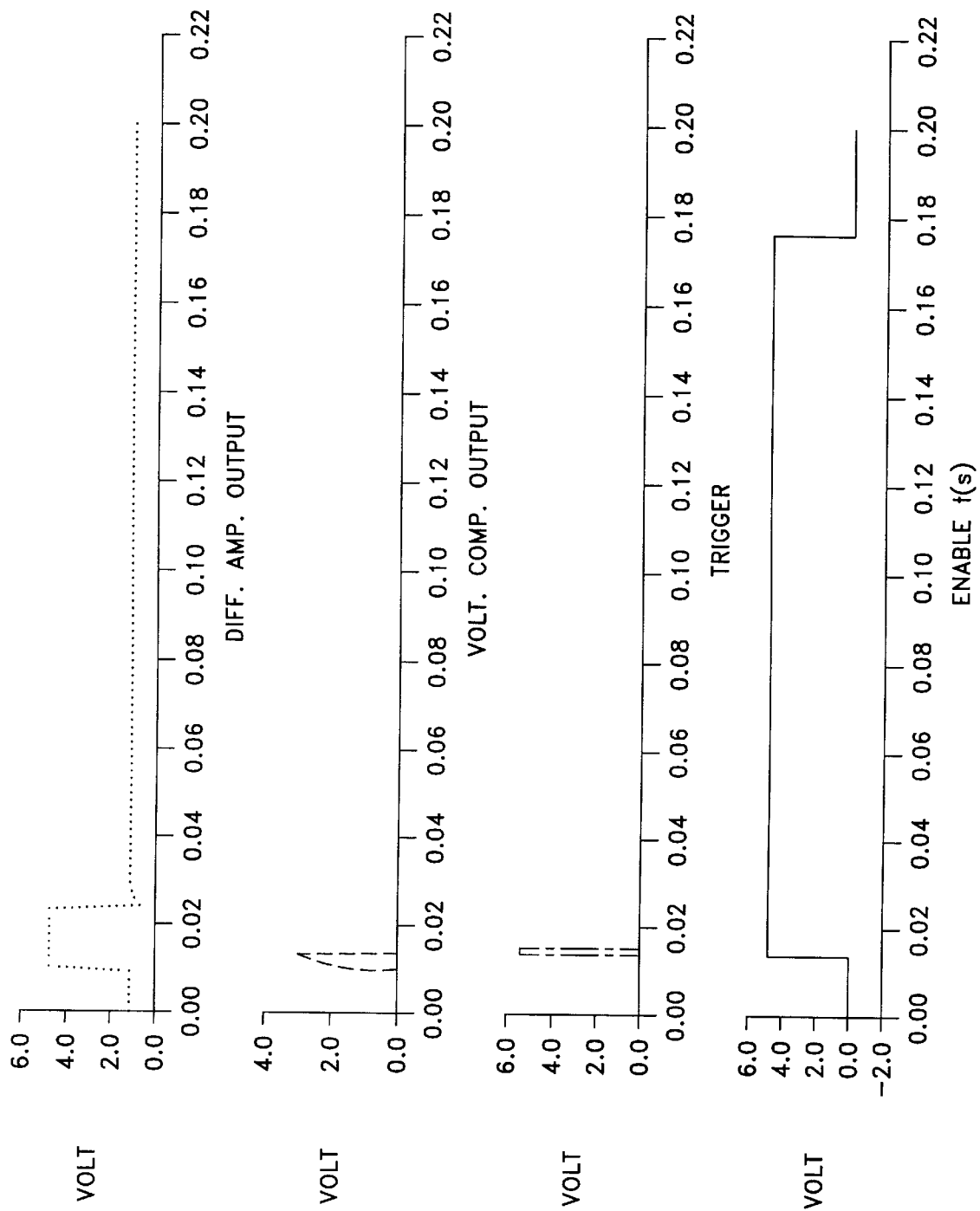
Fig.5 (FIRST STAGE ACTUATION, SECOND STAGE ENABLED)

VEHICLE OCCUPANT PROTECTION APPARATUS AND METHOD HAVING MULTIPLE STAGE CONTROL

FIELD OF THE INVENTION

The subject invention relates to vehicle occupant protection device control, and is particularly directed to control of a plurality of actuatable protection device stages.

BACKGROUND OF THE INVENTION

Occupant protection systems for use in vehicles are known in the art. One example type of a protection system includes an actuatable inflatable restraint device, which has an inflatable restraint cushion. The inflatable cushion is commonly referred to as an air bag and the device is referred to as an air bag module.

A controller determines whether the air bag module is to be actuated to inflate the air bag within a vehicle passenger compartment. The air bag module is actuated by the controller upon the occurrence of a predetermined condition for which a vehicle occupant is to be cushioned by the air bag. For example, when a crash sensor that is operatively connected to the controller senses a vehicle condition indicative of a vehicle crash condition, the air bag module is actuated.

Actuation of the air bag module includes initiation of a source of inflation fluid. An inflation fluid source includes gas generating material and/or a gas storage container. In one example type, fluid source initiation involves ignition of an igniter via electrical actuation. Often the igniter is a pyrotechnic squib. When an air bag module containing a squib is to be actuated, an electric current of sufficient magnitude and duration is passed through the squib to ignite the squib.

One particular type of air bag module is known in the art as a multi-stage system and includes a plurality of actuatable stages. Such a multi-stage air bag module typically includes two or more separate sources of inflation fluid controlled by actuation of associated squibs.

Turning to the condition that results in air bag module actuation, the typical condition is a vehicle crash condition. It is common to use a crash sensor that is an accelerometer to sense the vehicle crash condition. The accelerometer is typically sensitive along a single axis (e.g., a fore-two-aft vehicle axis). Such an accelerometer can have a full-scale sensitivity of 50 G, but may not be sensitive enough to detect pre-crash braking. Often, it may be desirable to detect pre-crash braking (i.e., as a pre-crash cursor to a potential vehicle crash condition). Also, rough roads may effect the accelerometer. The effect imposed upon the accelerometer by rough roads is inversely related to the sensitivity of the accelerometer.

In view of the characteristics of the accelerometer, there is often a need for a redundant "safing" crash sensor in some occupant protection systems. The accelerometer is a primary sensor in such a system, and both the primary and the safing sensor must respond to a condition (e.g., vehicle deceleration) that is indicative of a vehicle crash condition in order for the protection device (e.g., the air bag module) to be actuated.

Turning again to multi-stage air bag systems, often it is desirable to initiate the stages at different times (e.g., second stage initiation subsequent to first stage initiation). It is known to control initiation of the multiple stages based upon a timer function, the idea being that a time period is tolled for a second stage while first stage initiation occurs. In one example, a timer for the second stage is started at a beginning of a crash event. However, it is often difficult to monitor for the beginning of the crash event to start the timer. False starts (and stops) of the timer could occur due to spurious signals generated as the result of road noise.

SUMMARY OF THE INVENTION

In accordance with a first aspect, the present invention provides a vehicle occupant protection apparatus. Protection means of the apparatus has first and second stages that are actuatable to protect a vehicle occupant. First stage actuator means actuates the first stage of the protection means, and second stage actuator means actuates the second stage of the protection means. Enable means of the apparatus is responsive to actuation of the first stage of the protection means and enables actuation of the second stage of the protection means.

In accordance with another aspect, the apparatus includes sensor means for sensing actuation of the first stage of the protection means. Enable means of the apparatus permits actuation of the second stage of the protection means in response to sensed actuation of the first stage of the protection means.

In accordance with yet another aspect, the present invention provides a vehicle occupant protection apparatus. The apparatus includes protection means that has first and second stages that are actuatable for protecting an occupant. First stage initiator means is initiatable for actuating the first stage of the protection means. The first stage initiator means is initiated in response to a flow of initiating electrical energy. Second stage initiator means is initiatable for actuating the second stage of the restraint means. First actuation determination means determines whether to initiate the first stage initiator means and provides an electrical potential for the initiating electrical energy. Safing means, operative in response to a condition indicative of a need to protect the occupant with the protection means, permits the flow of the initiating electrical energy from the potential to the first stage actuator means. Second actuation determination means, responsive to the flow of the electrical energy initiating the first stage actuator means and responsive to the operation of the safing means, determines whether to initiate the second stage initiator means.

In accordance with still another aspect, the present invention provides a method of controlling a vehicle occupant protection apparatus that has a protection means with first and second stages actuatable for protecting a vehicle occupant. The first stage of the protection means is actuated. Actuation of the second stage of the protection means is enabled in response to the actuation of the first stage of the protection means.

BRIEF DESCRIPTION OF THE DRAWINGS

The foregoing and other features and advantages of the present invention will become apparent to those skilled in the art to which the present invention relates upon reading the following description with reference to the accompanying drawings, wherein:

FIG. 4 shows time plots for signal values at various locations within the diagram of FIG. 3, with the signal values being associated with non-actuation of a first stage of the apparatus of FIG. 1; and FIG. 5 is similar to FIG. 4, but with signal values associated with actuation of the first stage.

DESCRIPTION OF PREFERRED EMBODIMENT

Figure 1:
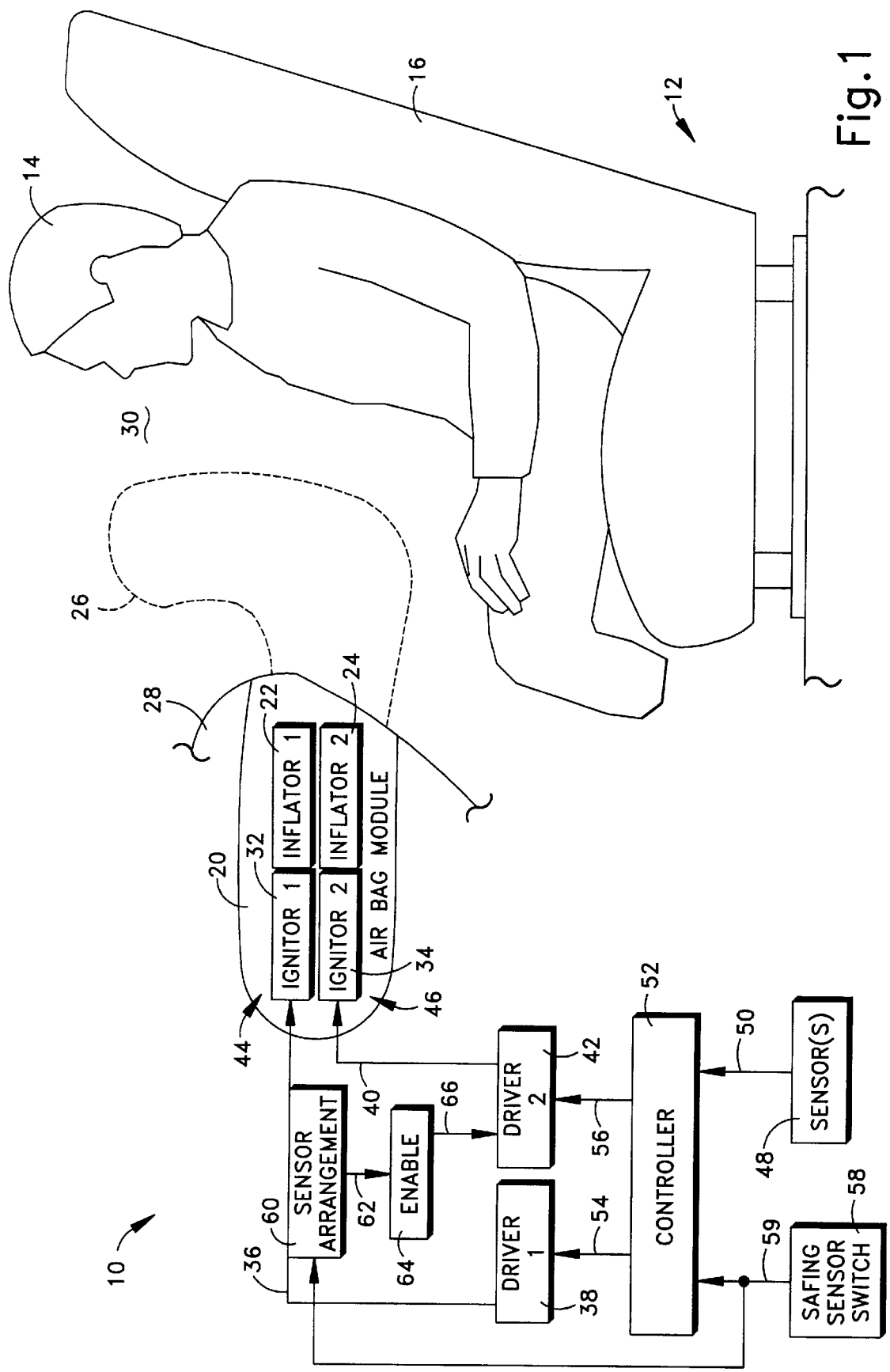
FIG. 1 is a schematic illustration of an occupant protection apparatus, incorporating the present invention, within an associated vehicle.

An occupant protection apparatus 10 and an associated vehicle 12 (only partially shown) are schematically illustrated in FIG. 1. The apparatus 10 is provided for an occupant 14 (e.g., a front seat passenger) seated on a vehicle seat 16 within the vehicle 12. The apparatus 10 includes an actuatable occupant protection device 20. For the purpose of illustration of the invention and not for the purpose of limitation, the specific example of the protection device 20 is a passenger side air bag module 20.

Although the apparatus 10 is shown and described as including the single air bag module 20, the present invention is not limited to use with such an air bag module. The present invention is applicable to any actuatable protection device that has multiple actuatable stages and is applicable to a plurality of actuatable protection devices that are actuated in a sequence to provide stages. Examples of such occupant protection devices include a driver side air bag module, a knee bag bolster module, a seat belt lock module, a seat belt pretensioner module, and a D-ring adjuster module. Only the single air bag module 20 that has a plurality of actuatable stages is described herein for simplicity of explanation.

Two sources 22 and 24 of inflation fluid (e.g., nitrogen gas) are provided within the air bag module 20 to supply inflation fluid to an associated air bag 26. Such inflation fluid sources 22 and 24 are commonly referred to as inflators. Each inflator (e.g., 22) includes a stored quantity of pressurized inflation fluid and/or and inflation fluid generating material. The air bag module 20 is located within an instrument panel 28 of the vehicle 12, and the inflation fluid flow inflates the air bag 26 within an occupant compartment 30 of the vehicle 12, as will be appreciated by a person of ordinary skill in the art.

Each inflator 22, 24 has an associated initiator 32, 34 that is activated to initiate flow of inflation fluid from the respective inflator. Preferably, the initiators 32 and 34 are igniters, and each igniter includes a pyrotechnic squib. The first igniter 32 is activated by an electrical initiation signal 36 provided by a first driver 38 and the second igniter 34 is actuated by an electrical initiation signal 40 provided by a second driver 42. A first stage 44 of the air bag module 20 includes the first igniter 32 and the first inflator 22, and a second stage 46 of the air bag module 20 includes the second igniter 34 and the second inflator 24.

The apparatus 10 includes at least one sensor 48 that senses a condition for which the occupant 14 is to be protected via actuation of the air bag module 20, and provides a signal 50 indicative of the sensed condition. In one example, the sensor 48 is a vehicle crash sensor 48 that senses the occurrence of a vehicle crash condition. Preferably, the crash sensor 48 senses crash acceleration and provides a signal that has a characteristic indicative of the sensed crash acceleration. Crash acceleration sensors and their output signals can take any of several forms known in the art. The crash acceleration signal can have an amplitude, frequency, pulse duration, etc. that varies as a function of the crash acceleration.

A controller 52 receives sensory input (e.g., the crash acceleration signal 50) from the sensor(s) 48. The controller 52 performs a process (e.g., a crash algorithm) to make a determination as to whether the initiation signal 36 is to be provided to initiate the first igniter 32 and thereby actuate the first stage 44. When the controller 52 determines that the first stage 44 should be actuated, a signal 54 is provided to the first driver 38. The controller 52 also makes a determination (e.g., performs a process such as a second algorithm) as to whether the initiation signal 40 is to be provided to the second igniter 34 and thereby actuate the second stage 46. When the controller 52 determines that the second stage 46 should be actuated, a signal 56 is provided to the second driver 42.

A safing sensor switch 58 is also connected to provide a signal input 59 to the controller 52. In one embodiment, the safing sensor switch 58 is a switch that closes in response to vehicle acceleration above a low-level threshold amount. The controller 52 utilizes the input 59 to verify the occurrence of a vehicle condition (e.g., vehicle crash) for which determinations regarding potential air bag actuation should proceed.

Preferably, at least a portion of the determination processes performed by the controller 52 is via a microcomputer of the controller. Although the use of a microcomputer is preferable, the invention is not limited to the use of a microcomputer. It is contemplated that discrete digital and/or analog circuitry could carry out functions performed by the microcomputer, and such circuitry can be assembled on one or more circuit boards or as an application specific integrated circuit (ASIC).

A sensor arrangement 60 senses the actuation of the first stage 44 of the air bag module 20. Specifically, the sensor arrangement 60 senses the initiation signal 36 that is provided to the first igniter 32. In response to sensing the actuation of the first stage 44, the sensor arrangement 60 provides a signal 62 to an enable arrangement 64. In turn, the enable arrangement 64 provides a signal 66 to the second driver 42 that permits the second driver to provide the initiation signal 40 to the second igniter 34 (i.e., whether to actuate the second stage 46 of the air bag module 20). Thus, the first stage actuation (e.g., ignition of the first igniter 32 to cause inflation fluid flow from the first inflator 22) occurs as a prerequisite to the actuation of the second stage (i.e., ignition of the second igniter 34 to cause inflation fluid flow from the second inflator 24). It is to be noted that in a preferred embodiment, the sensor arrangement 60 also senses the signal input 59 provided by the safing sensor switch 58 to the controller 52.

Figure 2:
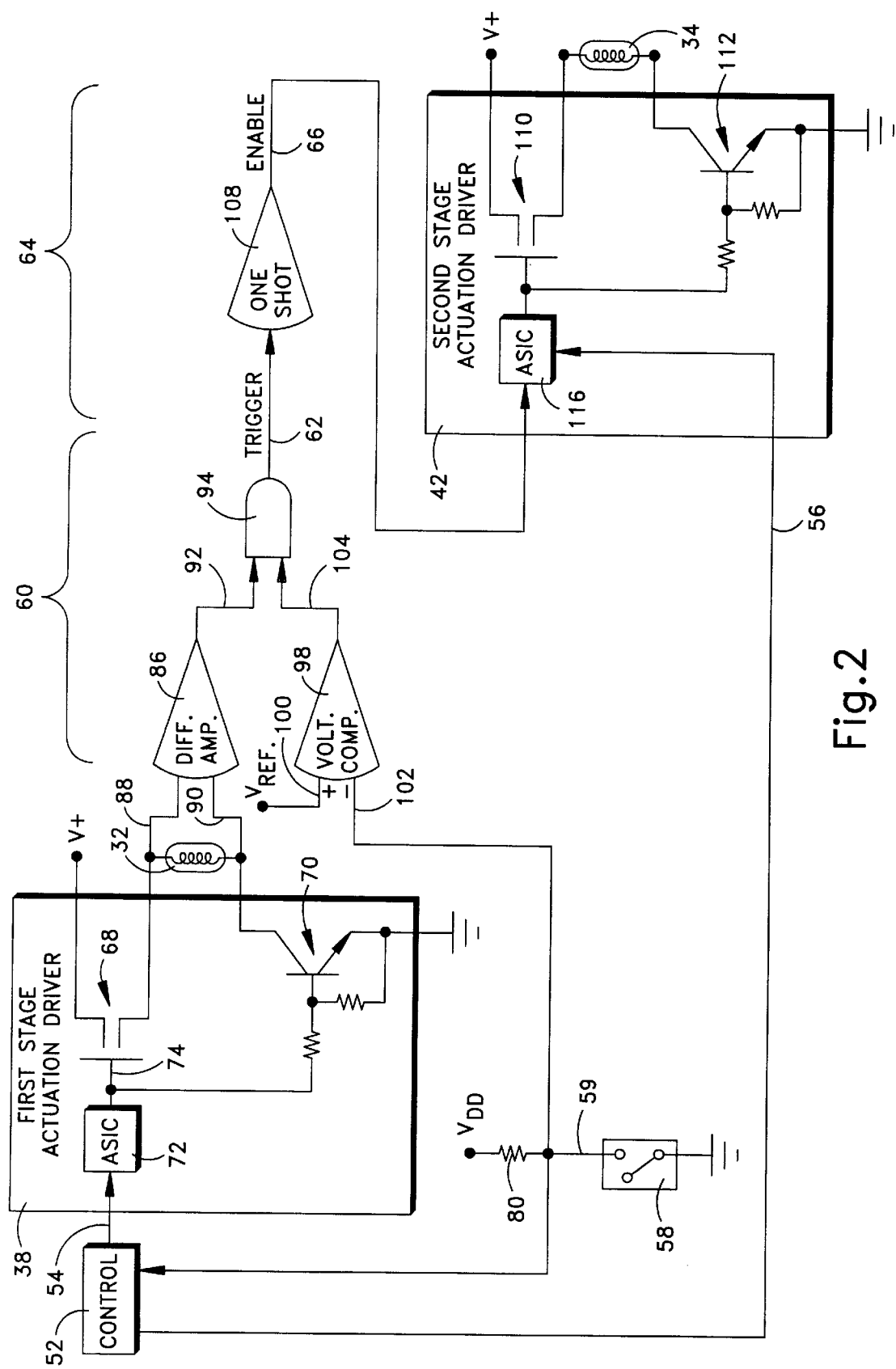
FIG. 2 is a schematic diagram of components that are a portion of the apparatus of FIG. 1.

Attention is directed to FIG. 2, which shows a preferred embodiment of the sensor arrangement 60 along with associated components within the first and second drivers 38 and 42. In the shown embodiment, the first and second igniters 32 and 34 are represented as first and second igniter squibs 32 and 34, respectively.

The first igniter squib 32 is connected in series with two electronic switches 68 and 70 between a power source V+ and electrical ground. The first electronic switch 68 is a field effect transistor ("FET") or similar device. The second electronic switch 70 is a NPN bi-polar junction transistor ("BJT") or similar device. When either of the two electronic switches 68 and 70 is in its "OFF" or "HIGH" impedance state, a firing current does not pass through the first igniter squib 32. Thus, the first igniter squib 32 only receives enough current to ignite if both electronic switches 68 and 70 are in their "ON" or "LOW" impedance states.

It is to be noted that additional components (not shown) maybe connected to the first igniter squib 32. Such additional components can include diagnostic components. A low, non-firing current may be passed through the first igniter squib 32 for diagnostic purposes.

An ASIC 72 of the first driver 38 operates the first and second electronic switches 68 and 70. When the controller 52 determines that the vehicle is experiencing a condition that warrants deployment of the air bag module 20 via actuation of the first stage 44 (i.e., ignite igniter squib 32), the signal 54 is provided to the ASIC 72. In turn, the ASIC 72 provides a signal on an output line 74 to turn ON the first and second electronic switches 68 and 70.

The safing sensor switch 58 is illustrated as a switch that is in series with a current limiting resistor 80 between a voltage supply $V_{DD}$ and vehicle ground. The resistor 80 is on the voltage supply side of the safing sensor switch 58. The signal 59 is derived from a junction between the resistor 80 and the safing sensor switch 58. When the safing sensor switch 58 is open (e.g., perceived acceleration is below a threshold value), a logic HIGH voltage value is provided to the controller 52. When the safing sensor switch 58 closes (e.g., perceived acceleration is above the threshold value), a logic LOW voltage value is provided to the controller 52. The logic LOW is the signal input 59 that verifies the occurrence of a vehicle condition (e.g., a vehicle crash condition) for which determination regarding potential air bag actuation should proceed.

A differential amplifier 86 of the sensor arrangement 60 has inputs 88 and 90 connected to ends of the first igniter squib 32. The differential amplifier 86 monitors the current flow through the first igniter squib 32. An example of a circuit for the differential amplifier 86 is identified in FIG. 3.

An output 92 of the differential amplifier (FIG. 2) has a voltage. The output voltage is below a predetermined voltage threshold in response to zero or relatively low current flow through the first igniter squib 32. Low level current flow may occur as a result of a diagnostic current being passed through the first igniter squib 32. The output voltage of the differential amplifier 86 is above the predetermined threshold level in response to current flow through the first igniter squib 32 that is sufficient to cause ignition of the first igniter squib.

Figure 3:
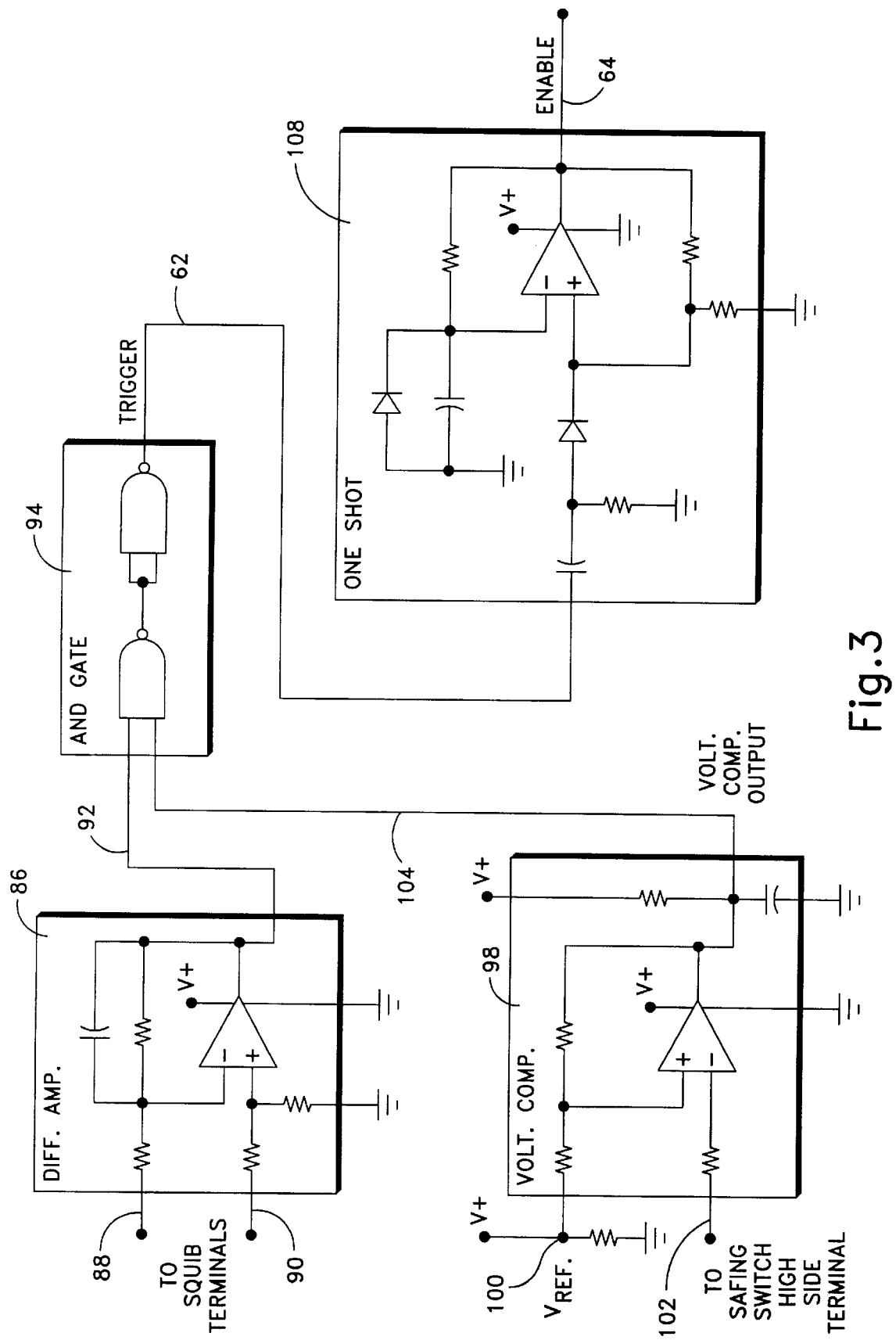
FIG. 3 is a circuit diagram of a first stage actuation sensing and second stage enable portion of the components shown in FIG. 2.

The output 92 of the differential amplifier 86 is provided as a first input to an AND gate 94. An example circuit for the AND gate 94 is shown in FIG. 3. Output voltage of the differential amplifier 86 (FIG. 2) below the threshold level is interpreted by the AND gate 94 as a logic LOW, and output voltage of the differential amplifier above the threshold level is interpreted by the AND gate as a logic HIGH.

A voltage comparator 98 of the sensor arrangement 60 has a positive terminal input 100 connected to a reference voltage $V_{REF}$. A negative terminal input 102 of the voltage comparator 98 is connected to the junction between the resistor 80 and the safing sensor switch 58. Thus, the negative terminal input 102 of the voltage comparator 98 receives the signal 59 regarding closure of the safing sensor switch 58. An output 104 of the voltage comparator 98 is provided as a second input of the AND gate 94. An example circuit for the voltage comparator 98 is shown in FIG. 3.

When the safing sensor switch 58 (FIG. 2) is open, a voltage value derived from $V_{DD}$ is provided at the second input 102 to the voltage comparator 98 and the output 104 from the voltage comparator is a voltage (e.g., zero) indicating a logic LOW. When the safing sensor switch 58 closes, the voltage at the second input 102 of the voltage comparator 98 is zero and the output 104 of the voltage comparator is a logic HIGH.

An output of the AND gate 94 is the trigger signal 62 and is provided as an input to a one-shot circuit 108 of the enable arrangement 64. An example of the details for the one-shot circuit 108 is shown in FIG. 3. When both inputs of the AND gate 94 (FIG. 2) are logic HIGH, the output signal 62 of the AND gate is a logic HIGH and the one-shot circuit 108 is triggered. The one-shot circuit 108 latches ON for a predetermined period of time.

In the illustrated example, the second driver 42 is somewhat similar to the first driver 38. The second igniter squib 34 is connected in series with two electronic switches 110 and 112 between the power source V+ and ground. An ASIC 116 of the second driver 42 controls operation of the first and second electronic switches 110 and 112.

The output of the one-shot circuit 108 is the enable signal 66 and is provided to the ASIC 116. In response to receipt of the enable signal 66, the ASIC 116 is enabled to provide a signal to turn ON the first and second switches 110 and 112 to actuate the second stage 46 of the air bag module 20. Specifically, the enable signal 66 is provided to the ASIC 116 to enable control of the first and second switches 110 and 112. Thus, it is to be understood that the provision of the enable signal 66 is a perquisite to the provision of current flow through the second igniter squib 34.

FIG. 4 shows an example of signal plots for various points within the example sensor arrangement 60 shown in FIGS. 2 and 3. The plots of FIG. 4 are for a scenario in which a diagnostic current through the first igniter squib 32 occurs coincident with a closure of the safing sensor switch 58 due to a disturbance such as a rough road. As shown in the signal plot for the differential amplifier output (i.e., output signal 92), the diagnostic current causes an output voltage (e.g., 1.4 volts) that is greater than zero for a portion of time (e.g., approximately 0.01 second). However, the output voltage from the differential amplifier 86 is below a threshold voltage level that the AND gate 94 uses to distinguish HIGH and LOW logic states. Thus, the output voltage from the differential amplifier 86 is interpreted as a logic LOW by the AND gate 94.

The output of the voltage comparator 98 is a steady-state zero volts while the safing sensor switch 58 is open, and has a voltage (e.g., approximately 3 volts) that exceeds a predetermined voltage threshold upon safing sensor switch closure. The voltage comparator output is interpreted by the AND gate 94 as a logic HIGH when the voltage exceeds the predetermined threshold. However, the output of the AND gate 94 remains LOW because only one of the AND gate inputs is logic HIGH (i.e., the input provided from the differential amplifier 86 remains LOW). The one-shot circuit 108 is not triggered and the output of the one-shot, which is the enable signal 66, remains LOW. Thus, the second driver 42 for second stage actuation is not enabled.

The plots in FIG. 5 are for the scenario in which the first stage 44 of the air bag module 20 is actuated (i.e., an initiation signal is provided to the first igniter squib 32). The output of the differential amplifier 86 reflects the initiating current flowing through the first igniter squib 32. Specifically, the output voltage (e.g., approximately 5 volts) exceeds the predetermined threshold for a duration of time (e.g., approximately 1 ms). The differential amplifier output is interpreted to be a logic HIGH during the period in which the voltage signal exceeds the threshold.

Also, the safing sensor switch 58 is closed to turn ON. The output of the voltage comparator 98 is a pulse having a magnitude of approximately 3V. Thus, the two inputs to the AND gate 94 are simultaneously HIGH and the AND gate outputs a HIGH pulse as the trigger signal 62. In response to the trigger signal 62, the one-shot circuit 108 turns ON and latches ON for a period of time. In the illustrated example, the latch ON time is for approximately 0.17 seconds. The enable signal 66 enables the second driver 42 to provide the signal 40 for second stage actuation if the signal 56 from the controller 52 is received within this time period.

From the above description of the invention, those skilled in the art will perceive improvements, changes and modifications. For example, it is contemplated that current flow through the first igniter squib 32 may be sensed in manner different than described above. Also, the sensing of the current flow may be done without the use of component(s) for sensing activation of the safing sensor switch 58 and/or the second electronic switch 70. Such improvements, changes and modifications within the skill of the art are intended to be covered by the appended claims.

Having described the invention, the following is claimed:

1. A vehicle occupant protection apparatus comprising:
   protection means having first and second stages actuatable for protecting a vehicle occupant;
   first stage actuator means for actuating said first stage of said protection means;
   second stage actuator means for actuating said second stage of said protection means; and
   enable means, responsive to actuation of said first stage of said protection means, for enabling actuation of said second stage of said protection means.

2. An apparatus as set forth in claim 1, including sensor means for sensing actuation of said first stage of said protection means and for providing a signal indicative of the sensed actuation to said enable means.

3. An apparatus as set forth in claim 2, wherein said first stage of said protection means is actuated by a current flow, said sensor means includes means for sensing the current flow.

4. An apparatus as set forth in claim 3, wherein said first stage actuator means includes switch means operable for permitting the current flow, said sensor means including means for sensing closure of said switch means.

5. An apparatus as set forth in claim 1, including determination means for determining whether to actuate said second stage of said protection means, said enable means including means for enabling performance of a determination to actuate said second stage.

6. An apparatus as set forth in claim 1, wherein said first stage of said protection means includes an electrically activated initiator.

7. An apparatus as set forth in claim 6, including sensor means for sensing electrical activation of said initiator.

8. An apparatus as set forth in claim 7, wherein said sensor means includes a differential amplifier connected across said initiator.

9. An apparatus as set forth in claim 7, wherein said first stage actuation means includes a switch for permitting electrical activation of said initiator, said sensor means includes a voltage comparator connected to said switch.

10. An apparatus as set forth in claim 1, wherein said enable means including means for providing an enable signal for a predetermined duration in response to actuation of said first stage of said protection means.

11. A vehicle occupant protection apparatus comprising:
    protection means having first and second stages actuatable for protecting a vehicle occupant;
    first stage actuator means for actuating said first stage of said protection means;
    second stage actuator means for actuating said second stage of said protection means;
    sensor means for sensing actuation of said first stage of said protection means; and
    enable means for permitting actuation of said second stage of said protection means in response to sensed actuation of said first stage of said protection means.

12. An apparatus as set forth in claim 11, wherein said first stage of said protection means includes an electrically activated initiator, said sensor means sensing electrical activation of said initiator.

13. An apparatus as set forth in claim 12, wherein said sensor means includes a differential amplifier connected across said initiator.

14. An apparatus as set forth in claim 12, wherein said first stage actuation means includes a switch for permitting electrical activation of said initiator, said sensor means includes a voltage comparator connected to said switch.

15. A vehicle occupant protection apparatus comprising:
    protection means having first and second stages actuatable for protecting an occupant;
    first stage initiator means initiatable for actuating said first stage of said protection means, said first stage initiator means being initiated in response to a flow of initiating electrical energy;
    second stage initiator means initiatable for actuating said second stage of said restraint means;
    first actuation means for determining whether to initiate said first stage initiator means and for providing an electrical potential for the initiating electrical energy;
    safing means, operative in response to a condition indicative of a need to protect the occupant with said protection means, for permitting the flow of the initiating electrical energy from the potential to said first stage actuator means; and
    second actuation means, responsive to the flow of the electrical energy initiating said first stage actuator means and responsive to the operation of said safing means, for determining whether to initiate said second stage initiator means.

16. A method of controlling a vehicle occupant protection apparatus that has a protection means with first and second stages actuatable for protecting a vehicle occupant, said method comprising:
    actuating the first stage of the protection means; and
    enabling actuation of the second stage of the protection means in responsive to the actuation of the first stage of the protection means.

17. A method as set forth in claim 16, including sensing actuation of the first stage of the protection means and providing a signal indicative of the sensed actuation of the second stage of the protection means.

18. A method as set forth in claim 17, wherein said step of actuating the first stage includes actuating the first stage by a current flow, said step of sensing includes sensing the current flow.

19. A method as set forth in claim 18, wherein said step of actuating the first stage includes actuating a switch to permit the current flow, said step of sensing includes sensing actuation of the switch.

20. A method as set forth in claim 16, including determining whether to actuate the second stage of the protection means, said step of enabling including permitting the determination of whether to actuate the second stage.

* * * * *